United States Patent
Henline et al.

(10) Patent No.: US 6,203,260 B1
(45) Date of Patent: *Mar. 20, 2001

(54) TOGGLE BOLT ASSEMBLY WITH BOLT CENTERING SPACER

(76) Inventors: Charles Henline, 61 N. Point Dr., Avon Lake, OH (US) 44012; Carl B. Henline, 14204 W. Darrow Rd., Vermilion, OH (US) 44089

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/396,664

(22) Filed: Sep. 15, 1999

(51) Int. Cl.[7] ................................................ F16B 21/00
(52) U.S. Cl. ......................... 411/340; 411/535; 411/546
(58) Field of Search ........................... 411/340–346, 535, 411/536, 546, 2, 3, 5; 248/909

(56) References Cited

U.S. PATENT DOCUMENTS

| | | | |
|---|---|---|---|
| 1,159,420 | * 11/1915 | Rubly | 411/340 |
| 3,094,892 | * 6/1963 | Topf | 248/909 |
| 3,835,615 | * 9/1974 | King | 248/909 |
| 3,946,636 | 3/1976 | Grey. | |
| 4,047,462 | 9/1977 | Hurtig. | |
| 4,075,924 | 2/1978 | McSherry et al.. | |
| 4,406,569 | 9/1983 | Askew. | |
| 4,500,239 | 2/1985 | Liebig. | |
| 4,504,180 | * 3/1985 | Ishii | 411/5 |
| 4,657,461 | 4/1987 | Smith. | |
| 4,793,755 | 12/1988 | Brown. | |
| 4,997,327 | 3/1991 | Cira. | |
| 5,207,524 | * 5/1993 | Arnold. | |
| 5,209,621 | 5/1993 | Burbidge. | |
| 5,702,218 | 12/1997 | Onofrio. | |

OTHER PUBLICATIONS

*Fasteners for Retail* 1997 Buyers Guide.

* cited by examiner

*Primary Examiner*—Flemming Saether
(74) *Attorney, Agent, or Firm*—Fay, Sharpe, Fagan, Minnich & McKee, LLP

(57) ABSTRACT

A toggle bolt assembly for use with an opening in an associated wall, the toggle bolt assembly comprising a bolt of a specified diameter including a threaded diameter, a shank, and a head. The toggle member has a threaded receiving aperture and a pair of wings pivotally mounted on opposite sides of the aperture. A bolt centering spacer comprises a generally cylindrical body having a first end, a second end, a longitudinal axis, an outside diameter substantially the same as a diameter of a hole in an associated supporting surface, and an opening having a diameter substantially the same as the threaded diameter of the bolt for receiving and centering the bolt. A flange positions the bolt centering spacer along a longitudinal axis of a hole in an associated supporting surface. At least one continuous groove circumferentially extends around an outside perimeter of the cylindrical body.

8 Claims, 1 Drawing Sheet

TOGGLE BOLT ASSEMBLY WITH BOLT CENTERING SPACER

BACKGROUND OF THE INVENTION

This invention pertains to an improved toggle bolt assembly. More particularly, this invention relates to a bolt centering spacer used with a toggle bolt type assembly which provides a snug fit between the toggle bolt exterior and a wall aperture perimeter.

Toggle bolts generally consist of a threaded bolt and a toggle which can be threaded onto the bolt. The toggle has a pair of wings which are urged open by a spring. In their collapsed position, the wings fit closely about the periphery of the bolt so that the toggle and bolt shaft can be inserted through a hole in a wall.

In connecting an object to the wall or the like by a toggle bolt, a hole is first drilled into the wall. The hole must have a diameter which is sufficient to allow the collapsed toggle with its wings in a closed position to pass through the hole. Next, the object to be secured to the wall is positioned about the bolt shaft and the toggle is threaded to the end of the bolt. The toggle wings are then collapsed and the toggle is passed through the hole by pushing the bolt shaft. After the toggle wings are completely through the wall the toggle springs open. Next, the toggle is pulled back into engagement with the wall such that the toggle wings bridge the hole in the wall. Holding the toggle wings against the wall surface so that the toggle does not rotate, the bolt is then rotated with respect to the toggle until the head of the bolt engages the object and the object is secured against the wall.

While toggle bolts have been used advantageously in the past, several problems have been present. One problem is that the hole drilled for insertion of the bolt must be larger than the diameter of the bolt in order for the toggle to pass through the hole. Since this hole is larger than the shaft of the bolt, the bolt shaft is free to shift inside the hole. This is undesirable and can cause mechanical working of the bolt against the wall material possibly resulting in a failure of the wall material or the bolt.

Another problem caused by the bolt shaft being smaller than the hole it passes through is that the toggle wings may unsymmetrically bridge the hole. If the bolt shaft is not centered in the hole one wing of the toggle may encounter more wall surface than the other wing. The portion of the wall supporting the smaller part of the toggle is likely to fail which in turn causes the remaining portion of the wall beneath the toggle to fail.

Although devices have been used in conjunction with toggle bolt assemblies in an attempt to overcome the above discussed problems, other problems are created by the use of such devices. One such problem is caused when these devices are used with varying wall thicknesses because the toggle device is prevented from engaging the wall.

Accordingly, it has been considered desirable to develop a new and improved toggle bolt assembly which would overcome the foregoing difficulties and others while providing better and more advantageous overall results.

BRIEF SUMMARY OF THE INVENTION

This invention pertains to an improved toggle bolt assembly. More particularly, this invention relates to a bolt centering spacer used with a toggle bolt assembly which provides a snug fit between a toggle bolt exterior and a wall aperture perimeter.

The toggle bolt assembly is used with a hole or an opening in an associated wall or support surface. The toggle bolt assembly is used to attach or secure an object to the supporting surface. The toggle bolt assembly comprises a bolt of a specified diameter including a threaded diameter, a shank, and a head. The toggle bolt assembly also comprises a toggle member having a threaded receiving aperture and a pair of wings pivotally mounted on opposite sides of the aperture. The wings extend from the threaded receiving aperture for securing the toggle member to the associated supporting surface. The toggle member threadedly engages the bolt via the receiving aperture.

The toggle bolt assembly further comprises a bolt centering spacer comprising a generally cylindrical body having a first end, a second end, a longitudinal axis, and an outside diameter substantially the same as a diameter of the opening in the associated supporting surface. The bolt centering spacer also includes an opening extending between the first and second ends of the cylindrical body having a diameter substantially the same as the threaded diameter of the bolt for receiving and centering the bolt. The bolt centering spacer further includes a flange extending radially outwardly from the first end of the cylindrical body. The flange positions the bolt centering spacer along a longitudinal axis of a hole in an associated supporting surface. The flange of the bolt centering spacer can include a diameter that is larger than a diameter of a hole on an associated supporting surface to prevent the bolt centering spacer from sliding completely through the hole of the associated supporting surface.

The bolt centering spacer also comprises at least one continuous groove circumferentially extending around an outside perimeter of the cylindrical body. The continuous groove includes a diameter that is smaller than the diameter of the cylindrical body. The bolt centering spacer can include a plurality of continuous grooves extending around the outside perimeter of the cylindrical body spaced along the longitudinal axis of the cylindrical body at predetermined positions for facilitating easy cutting of the bolt centering spacer to a corresponding width of the associated supporting surface.

The wings of the toggle member are selectively moveable between a spanned, open, position and a collapsed, closed, position. The toggle member can include a spring for holding the wings in the spanned, open, position after the toggle has been inserted into the hole of the associated supporting surface.

When the wings are in the collapsed closed position, the outside diameter of the toggle member is substantially the same as the outside diameter of the cylindrical body of the bolt centering spacer.

One advantage of the present invention is the provision of a new and improved toggle bolt assembly.

Another advantage of the present invention is the provision of a toggle bolt assembly which includes a bolt centering spacer that provides a snug fit for the bolt in a wall to firmly anchor heavy objects to the wall without distorting the wall material or causing wall failure.

Still another advantage of the present invention is the provision of a toggle bolt assembly which includes a bolt centering spacer capable of being utilized with varying wall thicknesses.

Yet another advantage of the present invention is the provision of a bolt centering spacer which produces a dimensionally stable toggle bolt assembly by positioning the toggle bolt shaft securely in the center of the wall hole thus preventing the toggle bolt shaft from moving to the edges of the large wall hole and away from the desired position.

Yet still another advantage of the present invention is the provision of a bolt centering spacer including a plurality of grooves for reducing the length of the bolt centering spacer such that its length equals the thickness of the wall the toggle bolt assembly is used upon.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts preferred embodiments of which will be described in detail in this specification and illustrated in the accompanying drawings which form a part hereof and wherein.

DETAILED DESCRIPTION OF THE PREFERRED EMBODIMENT

Figure 1:
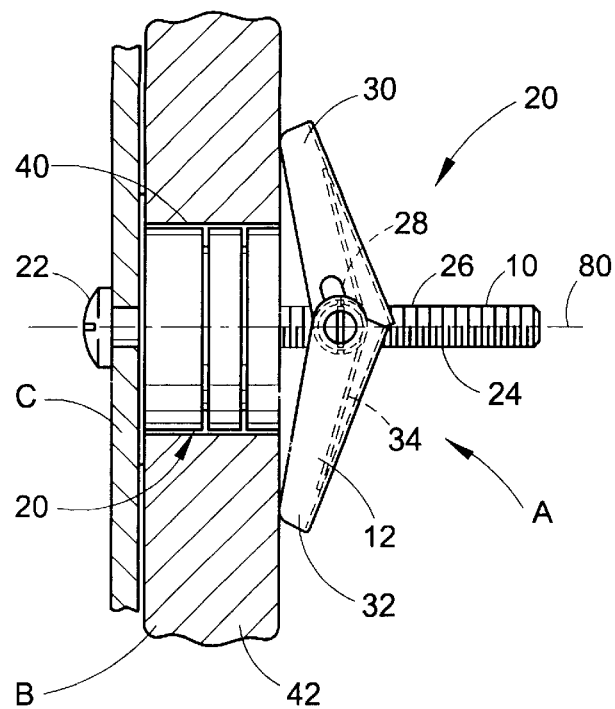
FIG. 1 is an enlarged cross-sectional view depicting a toggle bolt assembly with a bolt centering spacer.

Referring now to the drawings, the showings are for purposes of illustrating the preferred embodiment of the invention only and not for purposes of limiting same, FIG. 1 shows an enlarged cross-sectional view depicting a toggle bolt assembly A in accordance with one preferred embodiment of the present invention. The toggle bolt assembly A is shown fastened in a wall B or other support member. The toggle bolt assembly is used to secure an object C to the wall B.

The toggle bolt assembly comprises a threaded bolt 10, a toggle 12, and a bolt centering spacer 20. The threaded bolt 10 and the toggle 12 are conventional and well known parts of a toggle bolt assembly. The bolt 10 includes a head 22 and a shank 24 with a threaded diameter 26. The toggle 12 has a threaded receiving aperture 28, and a pair of wings 30 and 32, which are positioned on opposite sides of the aperture 28, and a spring 34 which springs the toggle wings 30, 32 to a spanned, open position after they pass through a hole 40 in wall material 42 to provide an anchor for the threaded bolt 10. The wall hole 40 has a diameter just large enough to receive the toggle 12 in a collapsed, closed, position (not shown). The threaded aperture 28 receives the threaded bolt 10.

Figure 2:
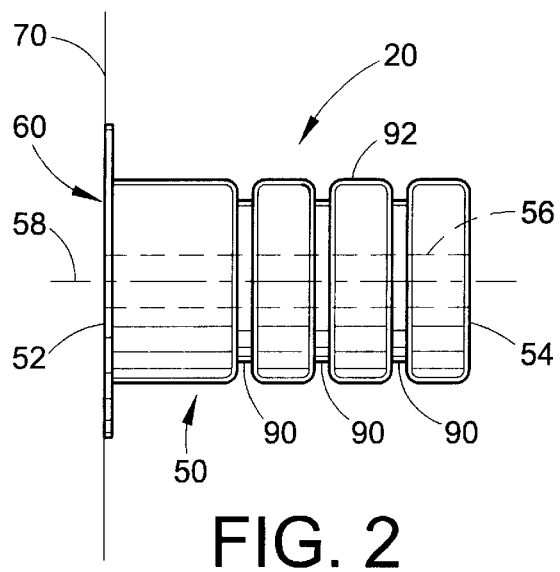
FIG. 2 is a side elevational view of the bolt centering spacer FIG. 1.

Referring now to FIG. 2, the bolt centering spacer 20 has a cylindrical body 50 which has an outside diameter substantially the same as the diameter of the wall hole 40. Also, the outside diameter of the cylindrical body 50 is substantially the same as an outside diameter of the toggle 12 when the wings 30 and 32 are in the collapsed, closed position. The outside diameter of the bolt centering spacer is larger than that of the threaded bolt 10. The cylindrical body 50 has a first, outer, end 52 and a second, inner, end 54. The cylindrical body 50 further includes an opening 56 which extends along a longitudinal axis 58 between first, outer, end 52 and second, inner, end 54.

Figure 3:
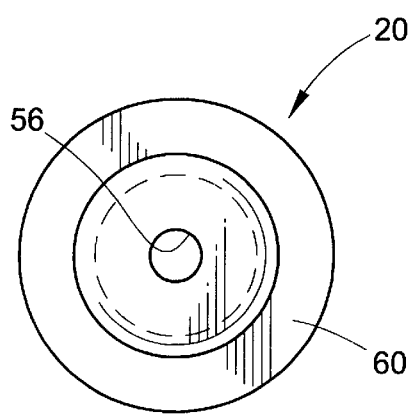
FIG. 3 is an end elevational view of the bolt centering spacer of FIG. 1.

Referring to FIGS. 2 and 3, the cylindrical body 20 also includes a flange portion 60 extending radially outwardly along a plane 70 of first, outer, end 52 of cylindrical body 50. Upon installation, the flange portion 60 is mounted flush against wall material 42 and maintains the position of the bolt centering spacer 20 along a longitudinal axis 80 of the wall hole 40. The flange 60 has a diameter that is greater than that of the wall hole 40 to prevent the bolt centering spacer from sliding completely through the hole 40. Additionally, the flange portion 60 width is small which eliminates any significant gap between the wall material 42 and the object B being secured.

The cylindrical body 50 also contains a plurality of grooves 90 positioned at predetermined lengths along the periphery surface 92 of the cylindrical body 50. The grooves 90 have a diameter smaller than the diameter of the cylindrical body 50, thus reducing the amount of material to be removed. This allows the bolt centering spacer to be easily shortened or cut to a length substantially the same as the longitudinal length of the hole 40 in the wall material 42.

If preferred, the bolt centering spacer is fabricated from injected molded plastic. The bolt centering spacer 20 provides a snug fit for the bolt 10 in the wall to firmly anchor a heavy object to the wall without disturbing the wall material 42 or causing wall failure. The bolt centering spacer produces a dimensionally stable bolt assembly by preventing the bolt shank 24 from moving to the edges of the wall opening and away from the desired position.

The invention has been described with reference to the preferred embodiment. Obviously, modifications and alterations will occur to others upon the reading and understanding of the preceding specification. It is intended that the invention be construed as including all such alterations and modifications insofar as they come within the scope of the appended claims or the equivalents thereof.

What is claimed is:

1. A toggle bolt assembly for use with a hole in an associated supporting surface, said toggle bolt assembly comprising:

a bolt of a specified diameter including a head and a threaded shank extending therefrom;

a toggle member having a threaded receiving aperture for selectively receiving the bolt therein and a pair of wings pivotally mounted on opposite sides of said aperture, said wings extend from said aperture for securing the toggle member to an associated supporting surface; and a bolt centering spacer comprising:

a hollow, generally cylindrical body having first and second ends spaced apart along a longitudinal axis, the body having an outside diameter and an opening extending between said first and second ends of said cylindrical body having a threaded diameter substantially the same as said threaded diameter of said bolt for receiving and centering said bolt, a flange extending radially outwardly from said first end of said cylindrical body, said flange adapted to engage an associated supporting surface, and at least one continuous groove circumferentially extending around an outside perimeter of said cylindrical body, said groove having first and second annular sidewalls spaced apart and generally parallel to each other and a substantially continuous surface extending horizontally between said spaced sidewalls, said continuous surface being substantially perpendicular to said sidewalls.

2. The toggle bolt assembly of claim 1 wherein said continuous groove includes a diameter that is smaller than said diameter of said cylindrical body.

3. The toggle bolt assembly of claim 2, wherein said bolt centering spacer includes a plurality of continuous grooves extending around said outside perimeter of said cylindrical body spaced along said longitudinal axis of said cylindrical body at predetermined positions for facilitating easy cutting of said bolt centering spacer to a corresponding width of said associated supporting surface.

4. The toggle bolt assembly of claim 1, wherein said wings of said toggle member are selectively moveable between a spanned, open, position and a collapsed, closed, position.

5. The toggle bolt assembly of claim 4, wherein said toggle member further comprises a spring for holding said wings in said spanned, open, position after said toggle has been inserted into said hole of said associated supporting surface.

6. The toggle bolt assembly of claim 4, wherein an outside diameter of said toggle member when said wings are in said collapsed, closed, position is substantially the same as said outside diameter of said cylindrical body of said bolt centering spacer.

7. The toggle bolt assembly of claim 1, wherein said bolt centering spacer is fabricated from injected molded plastic.

8. The toggle bolt assembly of claim 1, wherein said flange of said bolt centering spacer includes a diameter that is larger than a diameter of said hole of said associated supporting surface to prevent said bolt centering spacer from sliding completely through said hole of said associated supporting surface.

* * * * *